United States Patent [19]
Plura

[11] 3,802,568
[45] Apr. 9, 1974

[54] DEVICE FOR CONTINUOUSLY TREATING FLUIDS

[75] Inventor: Georg Plura, Bergneustadt, Germany

[73] Assignee: L. & C. Steinmuller GmbH, Gummersbach, Germany

[22] Filed: Oct. 31, 1972

[21] Appl. No.: 302,487

[30] Foreign Application Priority Data
Nov. 13, 1971 Germany.............................. 2156426

[52] U.S. Cl.................... 210/189, 210/269, 210/287
[51] Int. Cl............................................. B01d 33/30
[58] Field of Search ........ 55/99, 390; 210/31 R, 33, 210/189, 268, 269, 287, 289

[56] References Cited
UNITED STATES PATENTS

| 3,554,376 | 1/1970 | Kunz................................. | 210/189 |
| 3,193,498 | 7/1965 | Platzer et al.................... | 210/189 X |
| 2,959,542 | 11/1960 | Pye et al......................... | 210/189 X |
| 2,579,053 | 12/1951 | Schulstadt...................... | 210/289 X |

Primary Examiner—John Adee
Assistant Examiner—Robert H. Spitzer
Attorney, Agent, or Firm—Walter Becker

[57] ABSTRACT

A device for continuously treating fluids in an ion exchange bed having upper, middle, and lower bed sections, the device comprising a column-like hollow body, the ends of which are closed off with lid-like elements, distribution elements within the hollow body for the fluid to be treated and fluid treating medium, supply and discharge conduits for the fluid to be treated, the treated fluid, and the fluid treating medium, and tubes within the hollow body and parallel to its longitudinal axis, the free ends of the tubes being firmly connected with intermediate plates. The uppermost tube is provided with cutouts extending all the way through. A smaller tube is concentrically arranged within the uppermost tube and flows into cutouts preferable radially extending through the uppermost tube. In the treating area of the middle bed section the tubes continue as solid rods, again forming tubes in the lower bed section. Cutouts are provided in the connecting region between the solid rod and the lower tube section.

7 Claims, 2 Drawing Figures

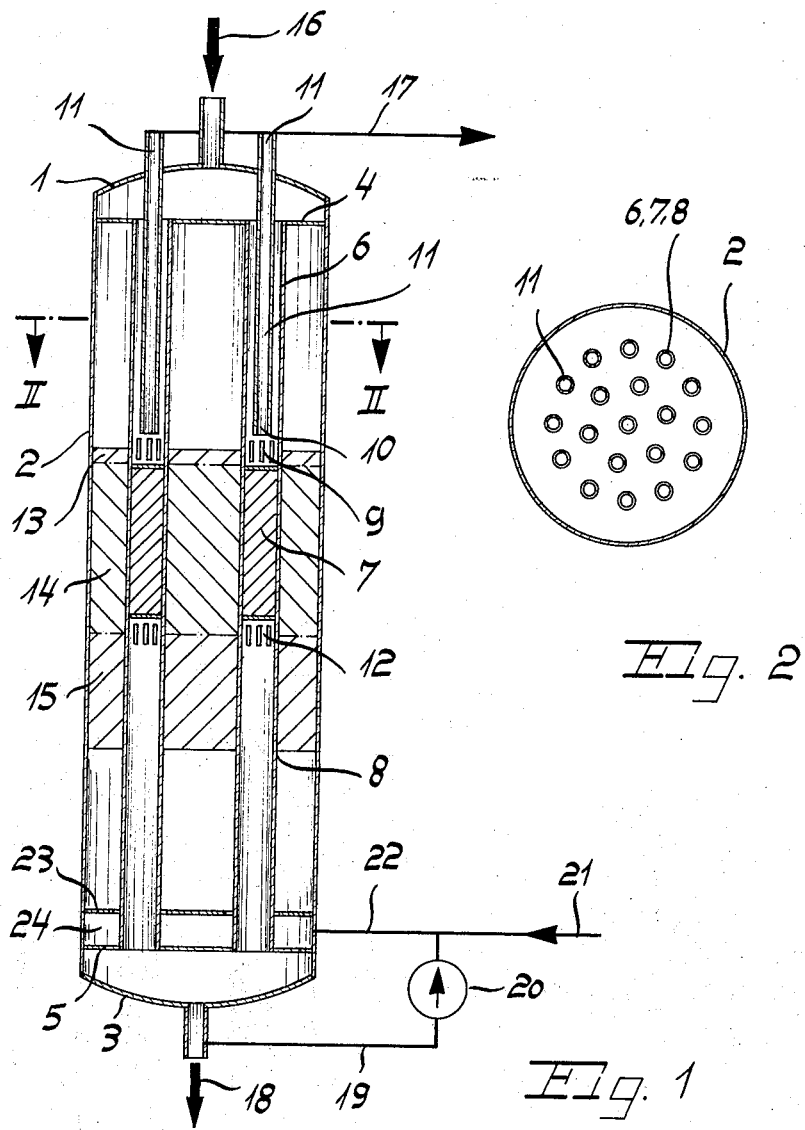

DEVICE FOR CONTINUOUSLY TREATING FLUIDS

The present invention relates to a device or apparatus for continuously treating fluids in an ion exchange bed. This device comprises a column-like hollow body, whose ends are closed off with lid-like elements. Within the hollow body are arranged dividing or distributing elements for the fluid to be treated and for the medium to be used in treating the fluid. The device also comprises supply and discharge conduits for the fluid to be treated and the treated fluid and for the medium to be used in treating the fluid.

With the heretofore known devices for continuously treating fluids, especially water, there exists the drawback that, in view of the tremendous apparatus construction, such devices are not economical.

According to one heretofore known device for continuous treatment of fluids, especially for the softening and/or desalting of water, a whirl bed or turbulence is used to which natural or untreated water is added from beneath through poured filling material. The used up ion exchange particles are carried off through the poured filling material through discharge pipes, and are conveyed into a regenerating column through a plurality of interposed auxiliary devices. Corresponding to the withdrawal of used up ion exchange particles, regenerated ion exchange particles are simultaneously applied to the whirl bed. As a result of the use of a whirl bed, a large expense for apparatus is necessary. Such expense is reflected not only in a very slender loading or pickup column, but also in a large regenerating column. Aside from these drawbacks, the maximum approximation of the desired purity to a sufficient extent is attainable with the bed form which is used in this device only if very slender and very tall loading or take up columns are used.

A further device for continuous treatment of water or other aqueous fluids is known, with which a specific construction or buildup of the bed and the device assure the continuity of the method. The buildup of the bed is of such a type, that finely divided magnetic material is added to the ion exchange particles. The bed is defined on the top and bottom side by perforated plates, which are provided with screens. The fluid to be treated is introduced into the bed from below above the perforated plate which defines the bottom of the bed, and is withdrawn from above the perforated plate which defines the top of the bed. The used up exchange particles pass through the lower perforated plate into a funnel-shaped outlet, and from there, with the aid of a resin delivery pump, into a regenerating station. From this regenerating station the regenerated ion exchange particles, again with the help of a resin delivery pump, are supplied to the bed anew through a conduit ending below the perforated plate defining the upper side of the bed. The drawbacks inherent to this known device consist primarily in that the resin delivery pump, which guarantees continuity of the device, requires an addition of magnified particles to the ion exchange particles. Without such an addition, the ion exchange particles splinter or shatter, and a steadily increasing pressure loss results; consequently, interruptions in operation are unavoidable.

It is an object of the present invention to produce a device of the above mentioned general type, with which the above described method can be safely carried out.

It is a further object of the invention that the apparatus construction of the device according to the invention be kept within economical bounds.

These and other objects and advantages of the invention will appear more clearly from the following specification in connection with the accompanying drawing in which:

FIG. 1 schematically illustrates a longitudinal section through the entire device according to the invention.

FIG. 2 is a section of the device according to the invention taken along the line II — II of FIG. 1.

The device according to the present invention is characterized primarily in that the pipes or tubes are introduced within the column-like hollow body parallel to its longitudinal axis, the free ends of the pipes or tubes being firmly or tightly connected with intermediate plates. The uppermost pipe or tube is provided on one of its ends with cutouts or passages which extend all the way through. These cutouts may be arranged selectively above the bed section, at the same height as the bed section, or in the bed section. A smaller pipe or tube is concentrically arranged within the uppermost pipe or tube. This smaller pipe or tube begins shortly above and/or below the cutouts, and leads into cutouts which preferably radially extend all the way through the uppermost pipe or tube. In the treating area of the bed section, the uppermost pipe or tube continues as a solid rod, and from the lower end of the bed section up to the lower intermediate plate it again forms a pipe or tube. In the connecting region on the solid rod, the wall of the pipe or tubing is provided with cutouts.

In order to uniformly distribute the regenerated ion exchange particles over the total surface in the lower region of the device, it is further suggested according to the invention that a selectively perforated or solid distribution plate be arranged above the lower intermediate plate. This distribution plate is penetrated by the lower pipes or tubes. A conduit for the partial stream which conveys regenerated ion exchange particles leads into the space formed by the distribution plate and the lower intermediate plate.

For purposes of generating a pressure differential between the finished fluid stream and the partial stream conveying regenerated ion exchange particles, it is further proposed according to the invention that a pump be arranged in the conduit which branches off from the conduit conveying the finished fluid stream.

Referring now to the drawing in detail, the device shown therein comprises a lid 1, a hollow body 2, a bottom 3, an upper intermediate plate 4, and a lower intermediate plate 5. These intermediate plates 4, 5 are connected to one another by the pipes or tubes 6, the solid rods 7 and the pipes or tubes 8. Cutouts 9 and 10 are arranged in the pipes or tubes 6. The pipes or tubes 11 are concentrically arranged in the pipes or tubes 6 and begin at the cutouts 10. The upper portions of the pipes or tubes 8 are provided with cutouts 12. The compact ion exchange bed is subdivided into three bed sections; bed section 13 serves as the boundary layer, bed section 14 forms the treating layer, and bed section 15 serves as the conveying or transfer layer. The basic substance of the bed consists of ion exchange material which can be obtained commercially from chemical companies. The individual bed sections shown in the drawing refer to already charged ion exchange particles, i.e., ion exchange particles which have taken part in the reaction, and to ion exchange particles which have not yet taken part in the reaction.

The connection or the conduit 16 for the fluid to be treated is located on the upper lid 1. The pipes or tubes 11 preferably flow into the lid 1, where they join a conduit 17. The treated water is drawn off through the conduit 18. A conduit 19 branches off from this conduit 18, from where, by means of a pump 20, it leads into a conduit 21, which is continued as conduit 22 and leads into the chamber 24 formed by the dividing plate 23 and the intermediate plate 5.

The device operates as follows: the fluid to be treated, for example water, flows through the conduit 16 into the space formed by the lid 1 and the intermediate plate 4, and arrives in the bed section 13 by way of the pipes or tubes 6 and the cutouts 9. These cutouts 9 may be arranged above the bed section partially or entirely within the bed section 13 which forms the boundary layer. The untreated or natural water which is to be treated flows through the bed section 14, where it is treated, enters the pipes or tubes 8 by means of the cutouts 12, arrives in the space formed by the bottom 3 and the intermediate plate 5, and is conveyed to its point of destination through the conduit 18. A partial stream is branched off from the conduit 18 and by means of the conduit 19 and the pump 20 is joined with a partial stream of the conduit 21, and, together therewith, through the conduit 22, arrives in the chamber 24 formed by the intermediate plate 5 and the dividing or distributing plate 23. Regenerated ion exchange particles are continuously conveyed to the device through the conduit 21, 22. The regenerated ion exchange particles are carried to the bed section 15 from below. The distributing or distribution plate 23 may be formed as a perforated or solid plate, which is provided with openings for the pipes or tubes 8. If the distributing plate 23 is solid, the pipes or tubes 8 must be designed large enough so that the ion exchange particles can pass through.

The used up ion exchange particles which are to be regenerated are carried out of the device through the cutouts 10 by way of the pipes or tubes 11 and the conduit 17 to a regenerating station (not shown on the drawing), from where they are conveyed to the conduit 21, 22. The pipes or tubes 11 are concentrically passed into the pipes or tubes 6 and begin either above and/or below the cutouts 9 at the cutouts 10.

The advantage achieved with the device according to the invention consists in that a fluid, for example water, may be continuously treated, according to which, especially in contrast to the earlier described heretofore known method for the treatment of fluid, no whirl bed is required. Rather, with the device according to the invention, the treatment occurs in a so-called compact free floating bed and by means of the pressure differentials in the individual bed sections the bed is moved countercurrent to the treating stream. The device according to the invention does not require a large expense for apparatus nor does it require additional auxiliary devices.

The device according to the invention, as exemplified in the drawing, sees to it that the fluid to be treated is supplied from above and that the regenerated ion exchange particles are supplied from below. The possibility also exists, to rearrange the device so that the fluid to be treated is supplied from below and regenerated ion exchange particles from above. The latter arrangement is, of course, conditioned upon accordingly altering the remaining connections.

The specific embodiment illustrated in the drawing can be used in connection not only with a monobed but also with a mixed bed.

It is, of course, to be understood that the present invention is by no means limited to the specific showing in the drawing but also comprises any modifications within the scope of the appended claims.

What I claim is:

1. An apparatus for continuously treating fluids in an ion exchange bed having upper, middle, and lower bed section means, said middle bed section means including a treating area, which comprises: a column-like hollow body; cover means connected to said hollow body for closing off the ends thereof; distributing plate means arranged within said hollow body for distributing the fluid to be treated and the medium which is used to treat the fluid; supply and discharge conduit means connected to said hollow body for admitting fluid to be treated and medium used to treat the fluid, and discharging treated fluid respectively; upper and lower tube means arranged within said hollow body, solid rod means interposed between and in substantial alignment with said upper and lower tube means, said solid rod means being located in said treating area of said middle bed section means, said upper tube means being provided with first passage means therethrough, said first passage means being located at least in close proximity to said upper bed section means, the connecting area between said solid rod means and said lower tube means being provided with second passage means; upper intermediate plate means tightly interconnecting said upper tube means; lower intermediate plate means tightly interconnecting said lower tube means; and additional tube means arranged within said upper tube means so as to form therewith an annular chamber, said additional tube means beginning in the region of said first passage means and being provided with third passage means extending therethrough.

2. An apparatus according to claim 1, in which said upper and lower tube means are substantially parallel to the longitudinal axis of said hollow body.

3. An apparatus according to claim 1, in which said third passage means radially extend through said upper tube means.

4. An apparatus according to claim 1, in which said distributing plate means are arranged above said lower intermediate plate means and together with said hollow body form a chamber, said lower tube means passing through said distributing plate means, said apparatus also including additional conduit means leading into said chamber and conveying regenerated ion exchange particles into said chamber.

5. An apparatus according to claim 4, in which said distributing plate means are perforated.

6. An apparatus according to claim 4, in which said distributing plate means are solid and together with said lower tube means passing therethrough form annular passage means.

7. An apparatus according to claim 4, which includes a branch line branching off from said discharge conduit means and leading into said additional conduit means, and pump means in said branch line.

* * * * *